US007733779B2

(12) United States Patent
Charny et al.

(10) Patent No.: US 7,733,779 B2
(45) Date of Patent: Jun. 8, 2010

(54) STATELESS CALL ADMISSION AND CALL PREEMPTION WITH A SINGLE METERING AND MARKING SCHEME

(75) Inventors: Anna Charny, Sudbury, MA (US); Francois Le Faucheur, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 537 days.

(21) Appl. No.: 11/541,964

(22) Filed: Oct. 2, 2006

(65) Prior Publication Data
US 2007/0291643 A1 Dec. 20, 2007

Related U.S. Application Data

(60) Provisional application No. 60/813,674, filed on Jun. 14, 2006.

(51) Int. Cl.
H04L 12/24 (2006.01)
(52) U.S. Cl. .................. 370/235; 370/230; 370/232; 370/236
(58) Field of Classification Search .......... 370/230–240
See application file for complete search history.

(56) References Cited

U.S. PATENT DOCUMENTS

| 5,878,027 | A * | 3/1999 | Schmidt | 370/232 |
| 6,839,321 | B1 * | 1/2005 | Chiruvolu | 370/230.1 |
| 6,922,390 | B1 * | 7/2005 | Chapman et al. | 370/229 |
| 2003/0112829 | A1 * | 6/2003 | Sridhar | 370/522 |
| 2004/0071086 | A1 | 4/2004 | Haumont et al. | |
| 2006/0002297 | A1 | 1/2006 | Sand et al. | |
| 2008/0112316 | A1 * | 5/2008 | Charny et al. | 370/230 |
| 2008/0130502 | A1 * | 6/2008 | Charny et al. | 370/235 |

OTHER PUBLICATIONS

RFC 3168, "The Addition of Explicit Congestion Notification (ECN) to IP", K. Ramakrishnan et al., Sep. 2001.
RFC 2780, "IANA Allocation Guidelines for Values in the Internet Protocol and Related Headers", S. Bradner et al., Mar. 2000.
RFC 3032, "MPLS Label Stack Encoding", E. Rosen et al., Jan. 2001.
Briscoe et al., "Pre-Congestion Notification Marking", draft-briscoe-tsvwg-cl-phb-02.txt, Jun. 26, 2006.

(Continued)

Primary Examiner—Huy D Vu
Assistant Examiner—Amy Haspel
(74) Attorney, Agent, or Firm—Cindy Kaplan

(57) ABSTRACT

A method and system for call admission and preemption in a network having an ingress node and an egress node defining an ingress/egress node pair, and one or more core nodes located in a path between the ingress node and the egress node and configured to mark packets exceeding an admission threshold. The method includes calculating a sustainable preemption rate based on a rate of traffic received at the egress node from the ingress node that passed through the one or more core nodes without being marked, and a ratio between a preemption threshold and the admission threshold. If a traffic load to the egress node is greater than the sustainable preemption rate, at least some traffic is dropped so that the traffic load does not exceed the sustainable preemption rate for the ingress/egress node pair.

20 Claims, 7 Drawing Sheets

OTHER PUBLICATIONS

Briscoe et al., "An edge-toedge Deployment Model for Pre-Congestion Notification:Admission Control over a DiffServ Region", draft-briscoe-tsvwg-cl-architecture-03.txt,Jun. 26, 2006.

B. Briscoe et al., A Framework for Admission Control over DiffServ using Pre-Congestion Notification, IETF draft-briscoe-tsvwg-cl-architecture-02.txt, Mar. 6, 2006.

* cited by examiner

STATELESS CALL ADMISSION AND CALL PREEMPTION WITH A SINGLE METERING AND MARKING SCHEME

STATEMENT OF RELATED APPLICATION

The present application claims priority from U.S. Provisional Application No. 60/813,674, entitled STATELESS CALL ADMISSION AND CALL PREEMPTION WITH A SINGLE METERING AND MARKING SCHEME, and filed on Jun. 14, 2006. The contents of this provisional application are incorporated herein by reference in its entirety.

BACKGROUND OF THE INVENTION

The present disclosure relates generally to stateless call admission and call preemption with a single metering and marking scheme.

The IETF (Internet Engineering Task Force) is investigating methods for controlling the admitted load of voice (and multimedia) traffic over a packet network without support of per flow, or even per aggregate, states in the core. (See, B. Briscoe et al., "A Framework for Admission Control over DiffServ using Pre-Congestion Notification", IETF draft-briscoe-tsvwg-cl-architecture-03.txt, Jun. 26, 2006 and B. Briscoe et al., "Pre-Congestion Notification Marking", IETF draft-briscoe-tsvwg-cl-phb-02.txt, Jun. 26, 2006, which are both incorporated by reference herein in their entirety). This can be referred to as a CAC (Call Admission Control) approach over a stateless core.

The method relies on core nodes providing explicit notification information to edge nodes when the traffic load on a core link reaches certain levels. The edge nodes use some of this explicit notification information to decide whether new calls should be accepted. This is referred to as a flow "Admission" process. The edge nodes may also use some explicit notification information to drop calls that are already in place if needed. This is referred to as a flow "Preemption" process.

In order to provide the explicit notification information, the core node meters voice traffic load on each link, and when it reaches predefined thresholds the core node sets particular bits in the header of packets (PCN-bits (pre-congestion notification-bits)).

An important requirement for this method is that the Admission and Preemption processes are able to react at different load thresholds. For example, a network operator policy may be to stop admitting new voice calls when the load through a given link reaches 50%, but only start dropping calls when the load exceeds 70%.

Because of this requirement, the solutions proposed in IETF typically involve separate metering/marking schemes for Admission and for Preemption. In core routers, the traffic is metered against the Admission Threshold, and if in excess, a codepoint is set in the PCN-bits indicating "Admission Threshold exceeded". The traffic is also metered against the Preemption Threshold, and if in excess, another codepoint is set in the PCN-bits indicating "Preemption Threshold exceeded".

One approach proposed in IETF does not require preemption marking, however, it does require two separate measurement schemes; one measurement for Admission and another measurement for Preemption/Dropping. Furthermore, this approach mandates that the configured preemption rate is set to a drop rate. This is a significant restriction in that it results in preemption only taking effect once packets actually get dropped.

DESCRIPTION OF EXAMPLE EMBODIMENTS

Overview

A method and system for call admission and preemption in a network having an ingress node and an egress node defining an ingress/egress node pair, and one or more core nodes located in a path between the ingress node and the egress node and configured to mark packets exceeding an admission threshold. The method includes calculating a sustainable preemption rate based on a rate of traffic received at the egress node from the ingress node that passed through the one or more core nodes without being marked, and a ratio between a preemption threshold and the admission threshold. If a traffic load to the egress node is greater than the sustainable preemption rate, at least some traffic is dropped so that the traffic load does not exceed the sustainable preemption rate for the ingress/egress node pair.

Example Embodiments

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

A system and method described herein use separate Admission and Preemption Thresholds while using a single metering/marking scheme to enforce both. As described in detail below, the system and method reduce implementation requirements on core routers and reduce the number of codepoints needed in a very scarce resource (PCN-bits in packet header). The system and method described herein provide these benefits while imposing reasonably acceptable deployment constraints.

The embodiments described herein allow a system with a single metering/marking scheme to behave similarly to a system that uses separate metering/marking schemes for Admission and for Preemption, and is configured on all links with Preemption Thresholds and Admission Thresholds in the same ratio. As described in detail below, the system first uses a rate-based metering scheme for flow Admission and then imposes a system-wide restriction on the ratio between the configured Admission Threshold and Preemption Threshold.

Figure 1:
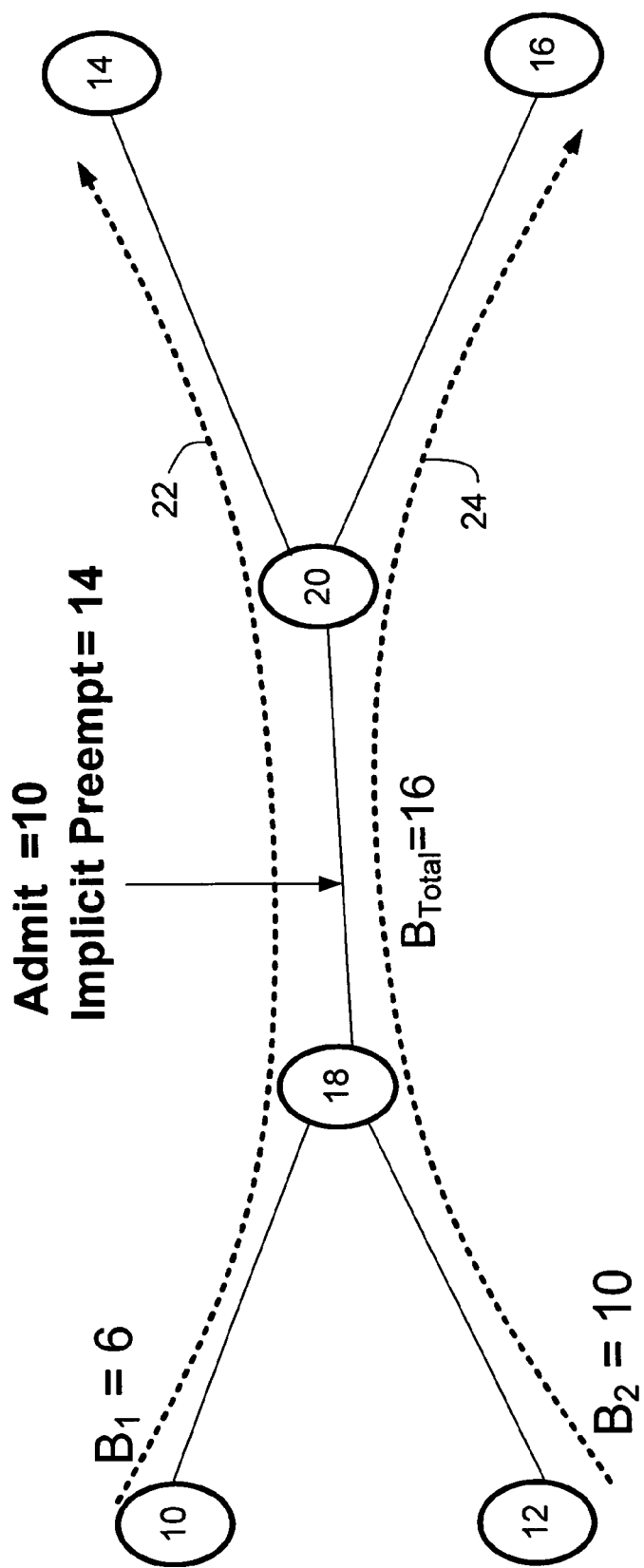
FIG. 1 illustrates a portion of an example network in which embodiments described herein may be implemented.

Referring now to the drawings, and first to FIG. 1, one example of a network that may implement embodiments described herein is shown. For simplification, only a small number of nodes are shown. The embodiments operate in the context of a data communication network including multiple network elements. Some of the nodes in a network that employs the embodiments may be network devices such as routers or gateways. The network device may include, for example, a master central processing unit (CPU), interfaces, and a bus. The CPU preferably includes memory and a processor. The network device may be implemented on a general purpose network host machine such as a computer system or network device described below with respect to FIG. 7.

Data traffic flows through various nodes including edge nodes 10, 12, 14, 16 and core nodes 18, 20. Adjacent nodes are coupled via one or more communication paths (links). The edge nodes may be ingress or egress edge nodes, depending on the direction of the traffic flow. As described below, the core nodes 18, 20 meter traffic and mark packets as required. The edge nodes 10, 12, 14, 16 use the metering and marking to perform flow Admission.

The ingress and egress edge nodes define ingress/egress node pairs. For example, in the network shown in FIG. 1, one ingress/egress node pair comprises nodes 10 and 14 and another ingress/egress node pair comprises nodes 12 and 16. The measurement and feedback described below are performed for each ingress/egress pair. For example, if two ingress nodes communicate to the same egress node, the egress node takes two measurements, one for each ingress node, and reports the corresponding measurement separately to each ingress node. Similarly, if one ingress node is in communication with two egress nodes, each egress node reports its own ingress/egress node pair measurement to the ingress node.

It is to be understood that the network shown in FIG. 1 is just one example and that the method and system described herein may be used within various configurations, sizes, and types of networks. The method and system may be implemented, for example, in network edge routers, VoIP Gateways, or Session Border Controllers (SBCs).

FIG. 1 illustrates the state of the network prior to preemption. Traffic passes along path 22 from ingress edge node 10 through core (interior nodes) 18, 20 to egress edge node 14. Traffic is also routed from ingress edge node 12 to egress edge node 16 through core nodes 18 and 20 via path 24. In the example of FIG. 1, the traffic load (bandwidth, rate) before preemption is $B_1=6$ at edge node 10 and $B_2=10$ at edge node 12. The total load passing from node 18 to node 20 is $B_{Total}=6+10=16$. The total load may be greater than the admission threshold of 10 for a number of reasons, such as rerouting due to link failure, for example.

The system preferably utilizes a metering scheme (e.g., Token-bucket+excess marking, or other suitable metering scheme) that is able to convey to the egress edge node the rate of traffic (for a given ingress/egress pair) that traverses the core while being under the metered rate on every link. In one embodiment, the core routers 18, 20 meter traffic (e.g., voice traffic) against a single Token Bucket whose rate is configured to the Admission Threshold. The core routers 18, 20 mark all packets which exceed the Token Bucket with an "Admission Threshold Exceeded" codepoint. The edge nodes may use this Admission metering and marking to perform flow Admission as defined, for example, in IETF draft-briscoe-tsvwg-cl-architecture-03.txt (referenced above).

In the example depicted in FIG. 1, the Admission Threshold (Admit) is set to 10 and the implicit Preemption Threshold (Implicit Preempt) is set to 14. These Threshold values may be set, for example, by a network operator in accordance with a predefined policy. A system-wide Preemption/Admission ratio (R) is defined as Preemption Threshold/Admission Threshold. The ratio (R) between the Preemption Threshold and Admission Threshold is the same on all of the links in the core. In the example of FIG. 1, the Preemption/Admission ratio (R)=14/10.

In the example of FIG. 1, since the total load passing from node 18 to node 20 is $B_{Total}=6+10=16$ while the Admission Threshold on that link is set to 10, the proportion of traffic that is forwarded by core router 18 onto that link unmarked is (Admission Threshold/$B_{Total}$)=10/16. The proportion of traffic forwarded onto that link with marking of the "Admission Threshold Exceeded" codepoint by core router 18 is (($B_{Total}$−Admission Threshold)/$B_{Total}$)=6/16.

Figure 2:
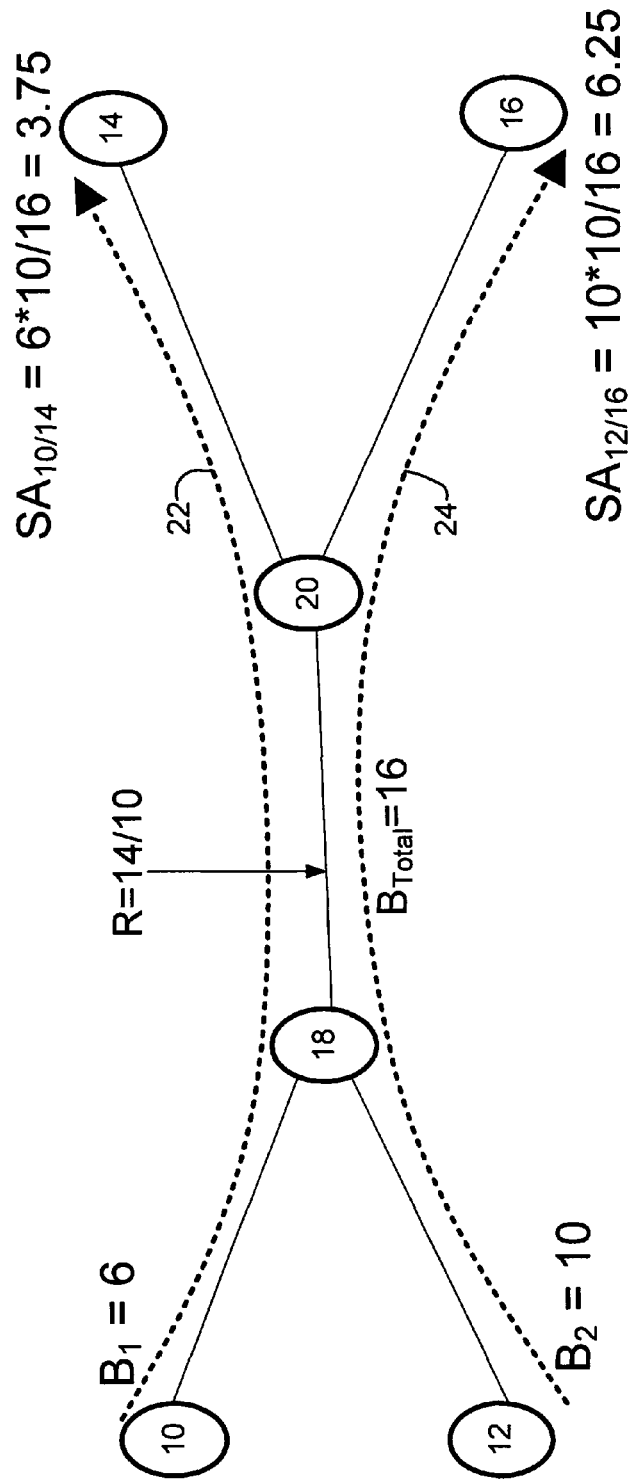
FIG. 2 illustrates measurement of Sustainable Admission Rate by egress edge nodes of the network of FIG. 1.

FIG. 2 illustrates how the egress edges measure a Sustainable Admission Rate (SA) (i.e., rate of traffic which went through the core without being marked with Admission Threshold exceeded codepoint). At egress edge nodes 14 and 16, SA is calculated by measuring the rate of traffic received unmarked (i.e., without the "Admission Threshold Exceeded" codepoint set). Since, as explained above, the proportion of traffic forwarded unmarked by core router 18 is 10/16, the rate of traffic received unmarked at egress node 14 from ingress node 10, and at egress node 16 from ingress node 12, is, respectively:

$$SA_{10/14}=B_1*10/16=6*(10/16)=3.75$$

$$SA_{12/16}=B_2*10/16=10*(10/16)=6.25$$

where:
$SA_{10/14}$ is the Sustainable Admission Rate for traffic from ingress node 10 to egress node 14 (e.g., for ingress/egress node pair 10/14); and
$SA_{12/16}$ is the Sustainable Admission Rate for traffic from ingress node 12 to egress node 16 (e.g., for ingress/egress node pair 12/16).

The system is preferably configured to provide conservative notification of the ingress node by the egress node that preemption may be needed (and provision of sufficient information to the ingress node to decide), to compensate for the fact that the egress node does not receive any explicit notification about a Preemption Threshold being exceeded in the core (unlike when a separate Preemption metering and marking scheme is used).

When the egress edge node 14, 16 detects that the Admission Threshold is exceeded (for a given ingress/egress pair), the egress node reports frequently to the ingress nodes 10 and 12 the measured rate of traffic from the corresponding ingress to the corresponding egress that went through the core without being marked with Admission Threshold exceeded codepoint.

Figure 3:
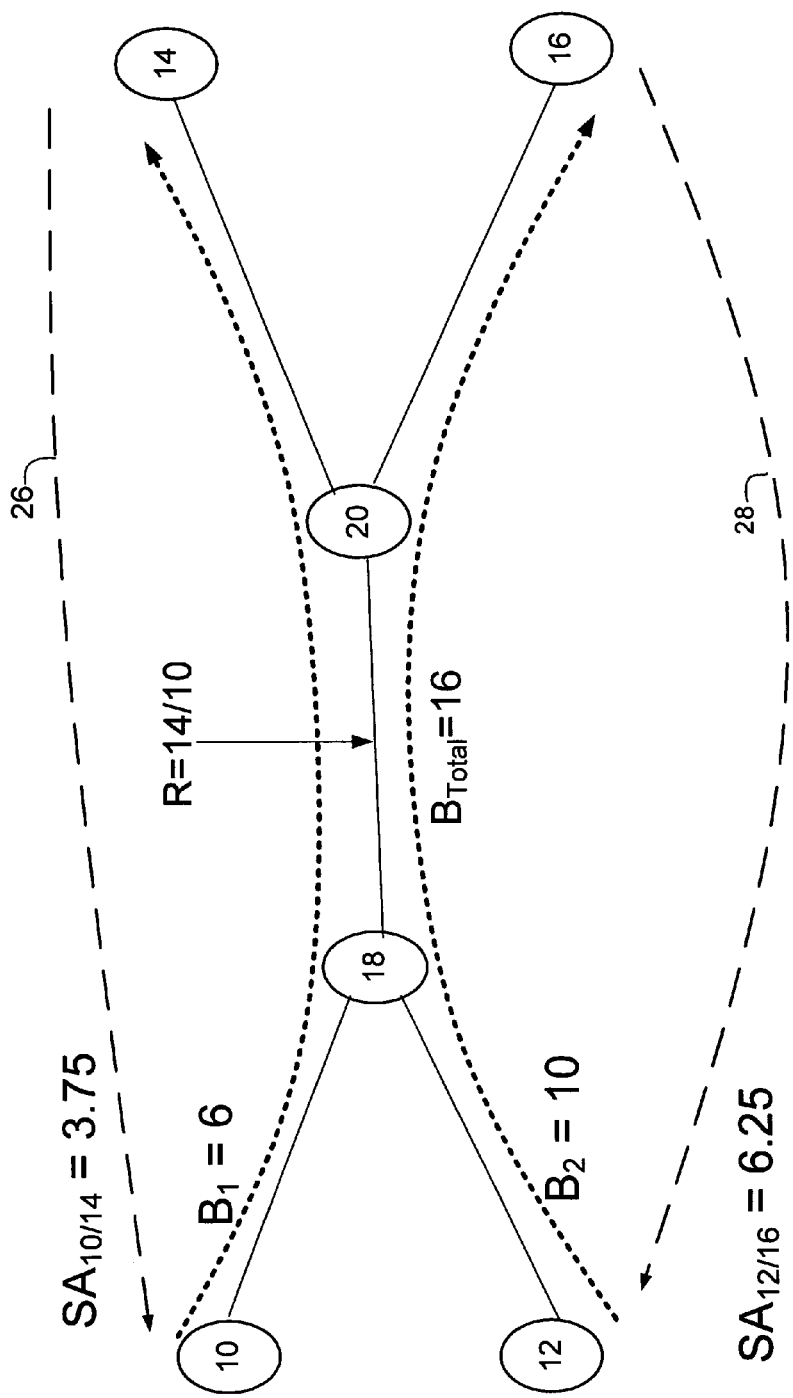
FIG. 3 illustrates an example of reporting of the Sustainable Admission Rate by the egress edge nodes to ingress edge nodes in the network of FIG. 1.

FIG. 3 illustrates the egress edge nodes 14, 16 signaling to the ingress edge nodes 10, 12 to report the measured rate of traffic that went through the core without being marked (Sustainable Admission Rate). Egress node 14 reports $SA_{10/14}$ to ingress node 10 and egress node 16 reports $SA_{12/16}$ to ingress node 12, as depicted by dashed lines 26, 28, respectively.

As those skilled in the arts will appreciate, an egress node, e.g., 14, may receive traffic from multiple ingress nodes, e.g., 10, 12. In this case, the egress node measures a separate Sustainable Admission Rate from each ingress node, and reports it separately to each ingress node. In effect the system uses a separate Sustainable Admission Rate for each ingress/egress node pair.

Figure 4:
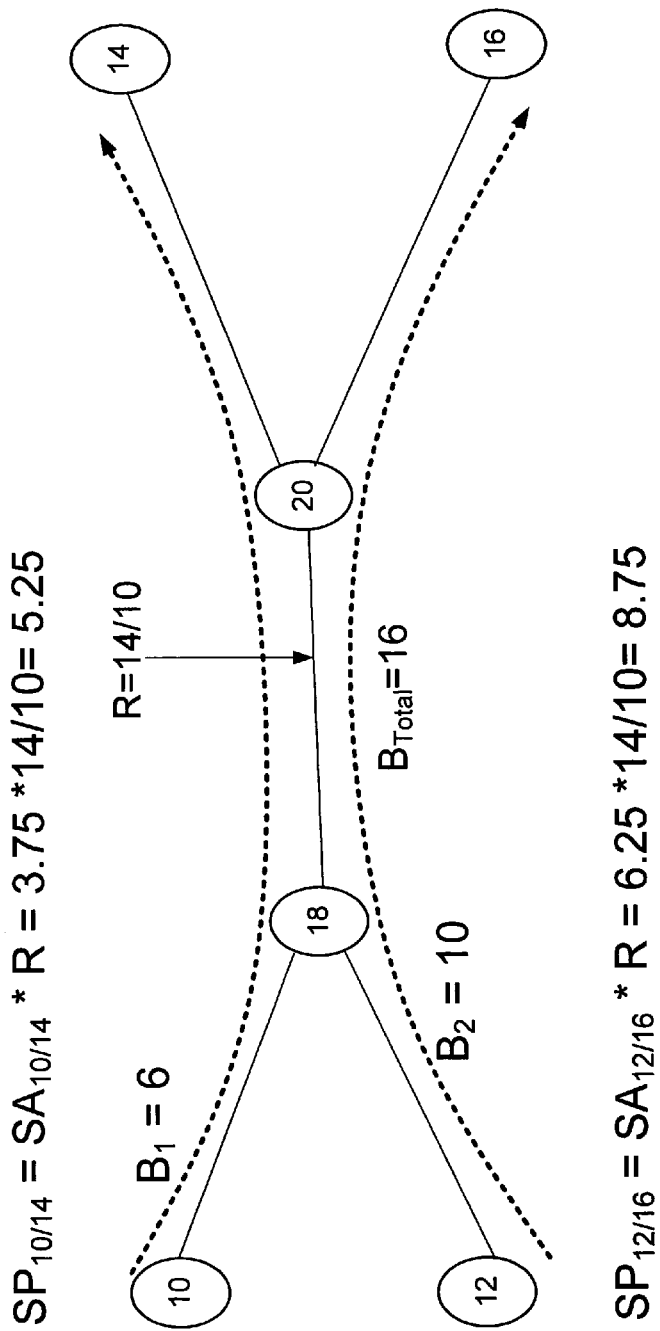
FIG. 4 illustrates an example of calculation of a Sustainable Preemption Rate by the ingress edge nodes.

Since the ratio (R) between the Preemption Threshold and Admission Threshold is the same on all links in the core, the rate of traffic for a given ingress/egress pair that traverses the core under the Preemption Threshold can be approximated by multiplying by R the Sustainable Admission rate for that ingress/egress pair. FIG. 4 illustrates how the ingress edge nodes 10, 12 compute a Sustainable Preemption Rate (SP) by multiplying the Sustainable Admission Rate (SA) by the system-wide Preemption/Admission ratio (R). SP is calculated as follows for the example shown in FIG. 4:

$$SP_{10/14} = SA_{10/14} * R = 3.75 * (14/10) = 5.25$$

$$SP_{12/16} = SA_{12/16} * R = 6.25 * (14/10) = 8.75$$

Figure 5:
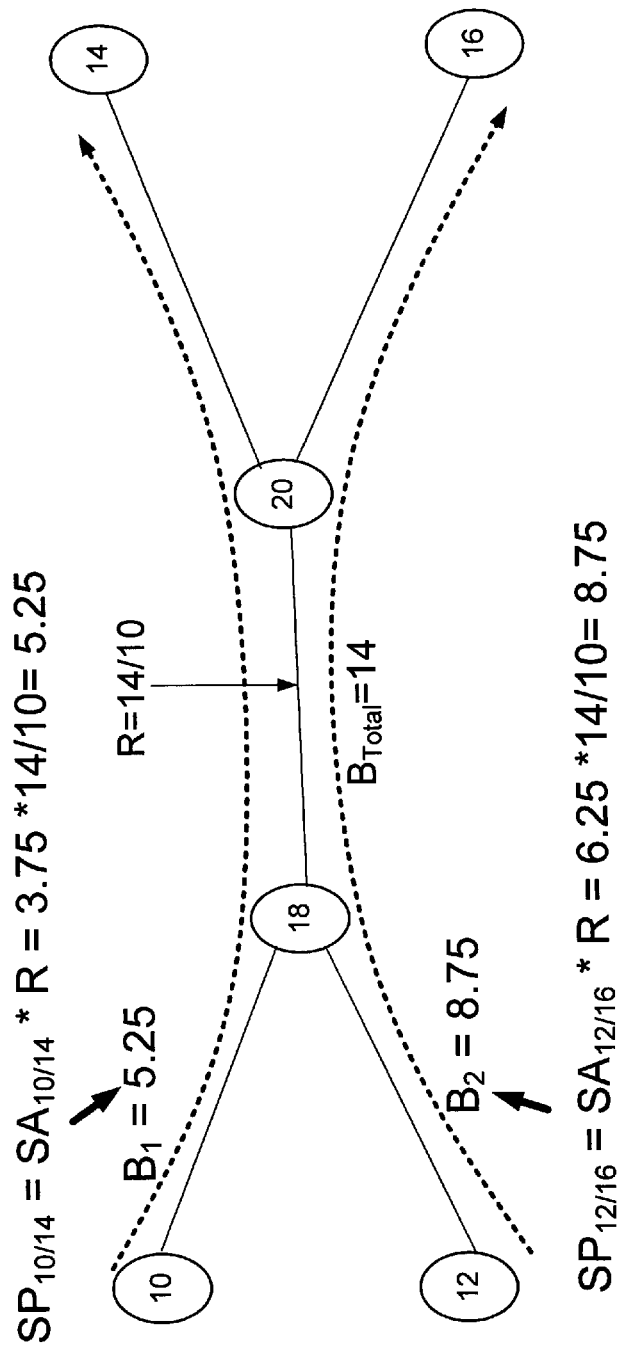
FIG. 5 illustrates an example of reduction of the current load to the Sustainable Preemption Rate calculated in FIG. 4.

FIG. 5 illustrates how the ingress edge nodes 10, 12 drop some flows according to a predefined policy to reduce the current load to the Sustainable Preemption Rate (SP) (modulo some safety/hysteresis factor). In this example, $B_1$ is reduced from 6 to 5.25 and $B_2$ is reduced from 10 to 8.75. The total rate $B_{Total}$ on the link from node 18 to node 20 is now equal to 14, which is the Implicit Preemption Rate on that link.

The following describes one example of admission control with the single marking and metering scheme in the core. The egress edge nodes measure the admission marked traffic or the total traffic in order to measure Congestion Level Estimate (CLE). CLE is the ratio of admission-marked traffic to the sustainable rate. The admission control decision is based on the CLE. The ingress stops admitting when the CLE level is above a configurable threshold. For example, the ingress edge node may stop admitting traffic to a specified egress edge node when it receives a CLE over 1% of the sustainable rate to that egress edge node.

Figure 6:
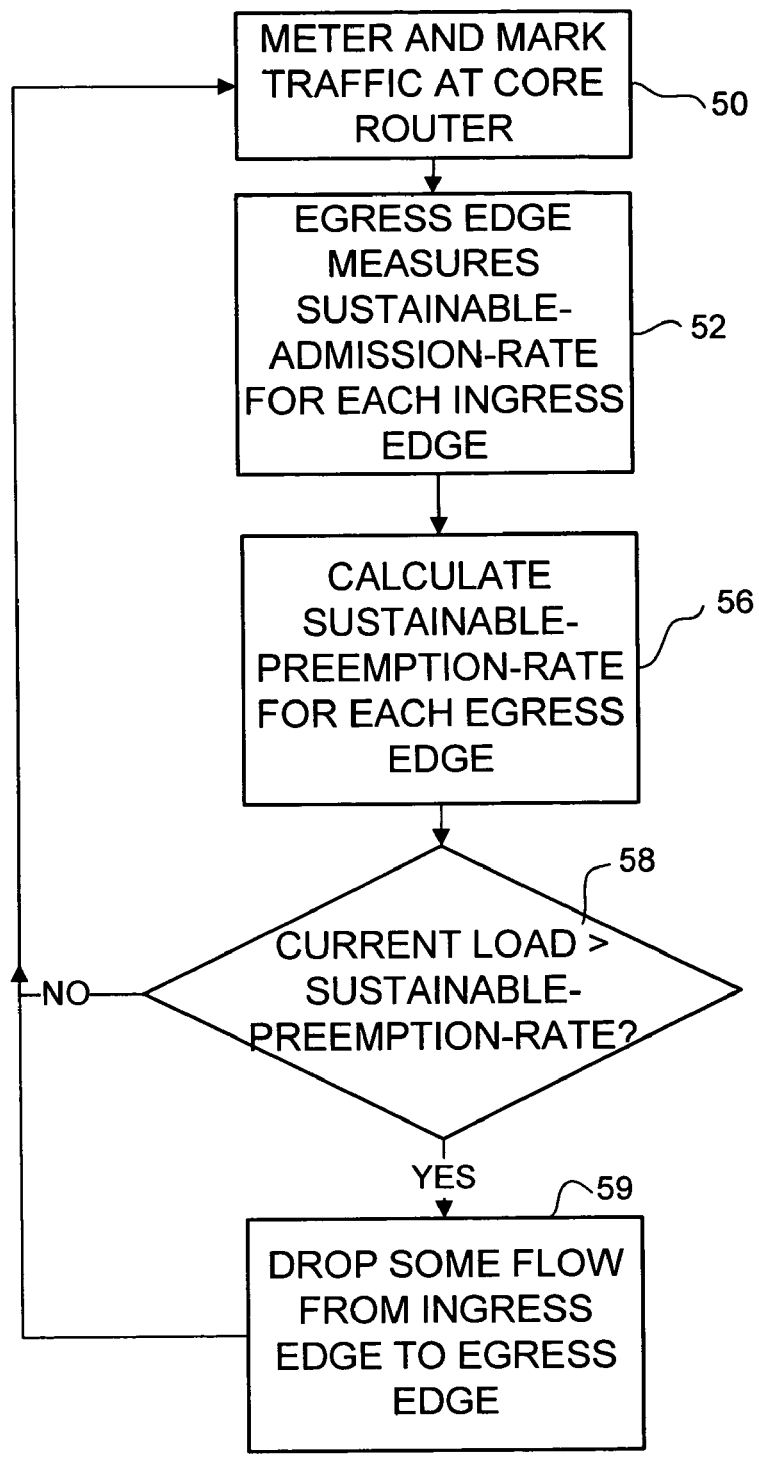
FIG. 6 is a flowchart illustrating one example of a process for stateless call admission and preemption with a single metering and marking scheme.

A flowchart illustrating one embodiment of the process described above for stateless call admission and call preemption with a single metering and marking scheme is shown in FIG. 6. At step 50, the core routers meter traffic and mark all packets that exceed the Admission Threshold. The egress edge nodes then measures the Sustainable Admission Rate (SA) for each ingress edge based on the measured rate of packets that went through the core without being marked (step 52). The egress edge nodes report the relevant Sustainable Admission Rate to each ingress edge node. The Sustainable Preemption Rate (SP) is then calculated at the ingress edge nodes for each egress node (step 56). The ingress edge nodes drop some flows traveling through a given egress node if the current load to that egress is greater than the Sustainable Preemption Rate (SP) calculated at step 56 for that egress (steps 58 and 59).

It is to be understood that the method illustrated in FIG. 6 and described above is only one example and that one or more of the steps may be performed at different nodes, without departing from the scope of the invention. For example, the egress node may compute the Sustainable Preemption Rate and signal the Sustainable Preemption Rate to the ingress node, rather than signaling the measured Sustainable Admission Rate. Also, the egress node may preempt flows. One or more of the steps may also be performed at a node in the network other than the ingress or egress nodes.

Figure 7:
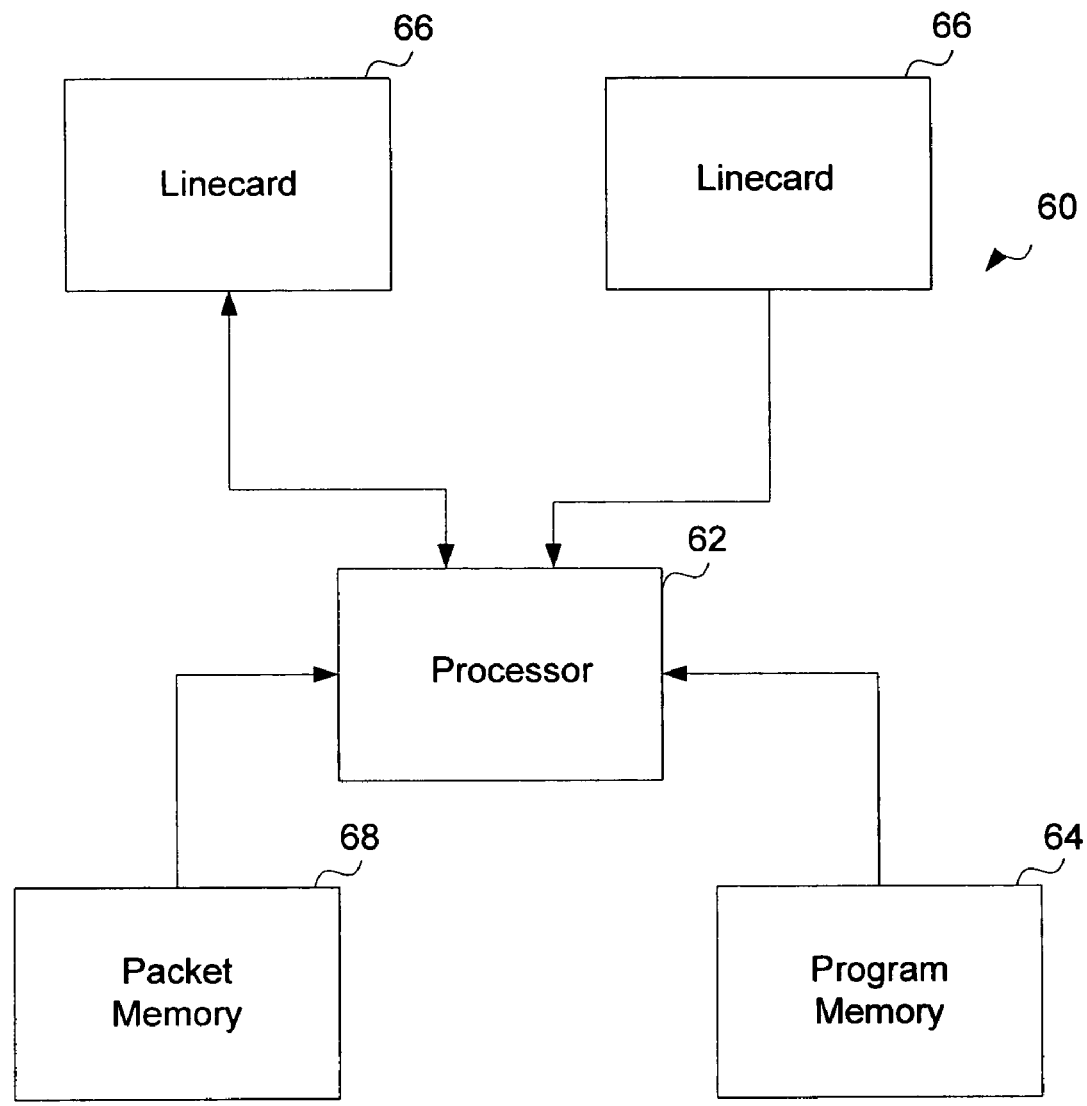
FIG. 7 depicts an example of a network device useful in implementing embodiments described herein.

FIG. 7 depicts a network device 60 that may be used to implement embodiments described herein. In one embodiment, network device 60 is a programmable machine that may be implemented in hardware, software, or any combination thereof. A processor 62 executes codes stored in a program memory 64. Program memory 64 is one example of a computer-readable medium. Program memory 64 can be a volatile memory. Another form of computer-readable medium storing the same codes would be some type of non-volatile storage such as floppy disks, CD-ROMs, DVD-ROMs, hard disks, flash memory, etc. A carrier wave that carries the code across the network is an example of a transmission medium.

Network device 60 interfaces with physical media via a plurality of linecards 66. Linecards 66 may incorporate Ethernet interfaces, DSL interfaces, Gigabit Ethernet interfaces, 10-Gigabit Ethernet interfaces, SONET interfaces, etc. As packets are received, processed, and forwarded by network device 60, they may be stored in a packet memory 68. To implement functionality according to the system, linecards 66 may incorporate processing and memory resources similar to those discussed above in connection with the network device as a whole.

As can be observed from the foregoing, the system and method described herein provide numerous advantages. For example, the use of a single metering/marking scheme for both Admission and Preemption provide a number of benefits, including reduced implementation requirements on core routers. Only one metering (e.g., token bucket) and marking scheme need to be activated on core routers and each packet only needs to be metered against this single metering.

Also, the single metering/marking scheme allows for a reduced number of codepoints that need to be conveyed in the packet header. The PCN-bits proposed to be used in the packet header to convey the congestion notification information are the bits of the ECN field (explicit congestion notification) (defined in S. Bradner et al., "IANA Allocation Guidelines For Values In the Internet Protocol and Related Headers", RFC 2780, March 2000 and K. Ramakrishnan et al., "The Addition of Explicit Congestion Notification (ECN) to IP", RFC 3168, September 2001) in an IP core and the bits of the EXP field (experimental use) (defined in E. Rosen et al., "MPLS Label Stack Encoding", RFC 3032, January 2001) in an MPLS core. These are small fields which are already targeted for multiple use and applications. For example, additional codepoints need to be conveyed in the same field (e.g., for anti-cheating and perhaps for compatibility with non-CAC capable systems), currently bringing the total to potentially 5 codepoints in systems using separate marking schemes for Admission and Preemption. The field available in case of IP is only 2-bits (i.e., the ECN field). In MPLS there is only a total of 8 EXP codepoints which must be shared with Diffserv. Thus, eliminating a codepoint is advantageous. Even if other bits than the ECN field or EXP bits were to be used in the packet header as the PCN-bits, there are very little bits or codepoints remaining available anywhere in the packet header, so eliminating a codepoint would be equally advantageous.

Furthermore, the system and method require only one measurement for admission, rather than one measurement for admission and another measurement for preemption/dropping. Also, there is no need for the configured preemption rate to be set to the drop rate.

Although the method and system have been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for call admission and preemption in a network comprising an ingress node and an egress node defining an ingress/egress node pair, and one or more core nodes located in a path between the ingress node and the egress node and configured to mark packets exceeding an admission threshold, the method comprising:

calculating a sustainable preemption rate, wherein calculating said sustainable preemption rate comprises multiplying a rate of traffic received at the egress node from the ingress node that passed through the one or more core nodes without being marked by a ratio between a preemption threshold and said admission threshold; and if a traffic load to the egress node is greater than said sustainable preemption rate, dropping at least some traffic so that said traffic load does not exceed said sustainable preemption rate for the ingress/egress node pair.

2. The method of claim 1 wherein said ratio between said preemption threshold and said admission threshold applies to other ingress and egress node pairs having a communication path passing through the one or more core nodes.

3. The method of claim 1 wherein the one or more core nodes are configured to meter traffic against a token bucket having a rate set to said admission threshold.

4. The method of claim 1 wherein said rate of traffic is not based on dropped or preempted packets.

5. The method of claim 1 further comprising:
receiving a congestion level estimate based on admission marked traffic at the egress node; and
stopping admitting of traffic to the egress node if said congestion level estimate is over a specified limit.

6. The method of claim 1 wherein calculating a sustainable preemption rate is performed at the ingress node.

7. The method of claim 1 wherein dropping at least some traffic is performed at the ingress node.

8. The method of claim 1 further comprising signaling said rate of traffic from the egress node to the ingress node.

9. The method of claim 1 wherein calculating said sustainable preemption rate is performed at the egress node and further comprising signaling said sustainable preemption rate from the egress node to the ingress node.

10. The method of claim 1 wherein dropping at least some traffic is performed at the egress node.

11. Apparatus for call admission and preemption, the apparatus configured for operation in a network comprising an ingress node and an egress node defining an ingress/egress node pair, and one or more core nodes located in a path between the ingress node and the egress node and configured to mark packets exceeding an admission threshold, the apparatus comprising:

a processor; and a memory that stores instructions for execution by said processor, said instructions comprising:

code that calculates a sustainable preemption rate by multiplying a rate of traffic received at the egress node from the ingress node that passed through the one or more core nodes without being marked by a ratio between a preemption threshold and said admission threshold; and code that, if a traffic load to the egress node is greater than said sustainable preemption rate, causes dropping of at least some traffic so that said traffic load does not exceed said sustainable preemption rate for the ingress/egress node pair.

12. The apparatus of claim 11 wherein the apparatus is configured for receiving a congestion level estimate based on admission marked traffic at the egress node, and to stop admitting traffic to the egress node if said congestion level estimate is over a specified limit.

13. The apparatus of claim 11 wherein said ratio between said preemption threshold and said admission threshold is configured to apply to other ingress and egress node pairs having a communication path passing through the one or more core nodes.

14. Apparatus for call admission and preemption in a network comprising an ingress node and an egress node defining an ingress/egress node pair, and one or more core nodes located in a path between an ingress node and an egress node and configured to mark packets exceeding an admission threshold, the apparatus comprising:

means for calculating a sustainable preemption rate by multiplying a rate of traffic received at the egress node from the ingress node that passed through the one or more core nodes without being marked by a ratio between a preemption threshold and said admission threshold; and if a traffic load to the egress node is greater than said sustainable preemption rate, means for dropping at least some traffic so that said traffic load does not exceed said sustainable preemption rate for the ingress/egress node pair.

15. The apparatus of claim 14 wherein the one or more core nodes are configured to meter traffic against a token bucket having a rate set to said admission threshold.

16. The apparatus of claim 14 wherein said rate of traffic is not based on dropped or preempted packets.

17. The apparatus of claim 14 further comprising:
means for receiving a congestion level estimate based on admission marked traffic at the egress node; and
means for stopping admitting of traffic to the egress node if said congestion level estimate is over a specified limit.

18. The apparatus of claim 14 wherein the apparatus is configured to operate as the ingress node or the egress node and said ratio is a predefined ratio that applies to other ingress/egress node pairs in the network.

19. The method of claim 1 wherein said rate of traffic received at the egress node from the ingress node that passed through the one or more core nodes without being marked, is received from the egress node.

20. The apparatus of claim 11 wherein the apparatus is configured to operate as the ingress node or the egress node and said ratio is a predefined ratio that applies to other ingress/egress node pairs in the network.

* * * * *